United States Patent [19]

Kominami et al.

[11] Patent Number: 5,663,211
[45] Date of Patent: Sep. 2, 1997

[54] ULTRAVIOLET CURING RESIN HAVING LOW PRIMARY IRRITATION INDEX FOR OPTICAL DISK

[75] Inventors: Hiraku Kominami; Harumi Saotome, both of Tochigi, Japan

[73] Assignee: Sony Chemicals Corporation, Tokyo, Japan

[21] Appl. No.: 645,156

[22] Filed: May 13, 1996

Related U.S. Application Data

[63] Continuation of Ser. No. 355,691, Dec. 14, 1994, abandoned.

[30] Foreign Application Priority Data

Jun. 27, 1994 [JP] Japan ...................... 6-144987

[51] Int. Cl.$^6$ ...................... C08F 2/50; C08F 220/28
[52] U.S. Cl. .................. 522/8; 522/14; 522/20; 522/42; 522/182; 522/99; 522/172; 528/26
[58] Field of Search ...................... 522/8, 20, 42, 522/182, 172, 99, 14; 528/26

[56] References Cited

U.S. PATENT DOCUMENTS 4,835,027   5/1989   Sudo et al. ...................... 428/64

FOREIGN PATENT DOCUMENTS 2-6562   1/1990   Japan.

*Primary Examiner*—Susan W. Berman
*Attorney, Agent, or Firm*—Hill, Steadman & Simpson

[57] ABSTRACT

An ultraviolet curing resin for an optical disk according to the present invention which includes: a multiacrylate-functional monomer selected from the group consisting of multiacrylate-functional monomers and multimethacrylate-functional monomers and mixtures of the foregoing monomers; a difunctional monomer selected from the group consisting of diacrylate-functional monomers, dimethacrylate-functional monomers and mixtures of the foregoing monomers; a diluent; an adhesion promoter; and a photopolymerization initiator. The ultraviolet curing resin may also include a surface tension adjusting agent.

5 Claims, 5 Drawing Sheets

FIG. 1

| | Inventive example 1 | Inventive example 2 | Inventive example 3 | Inventive example 4 | Inventive example 5 | Inventive example 6 | Inventive example 7 |
|---|---|---|---|---|---|---|---|
| 3EO-TMPTA | 40 | 40 | 50 | 40 | 30 | 50 | 60 |
| MANDA | 40 | 40 | 45 | 35 | | | |
| PHOTOMER 4160 | | | | | 50 | 30 | 20 |
| PO-A | 20 | | 5 | 25 | 20 | 20 | 20 |
| M-101 | | 20 | | | | | |
| THFA | | | | | | | |
| PM-2 | 0.1 | 0.1 | 0.1 | 0.1 | 0.1 | 0.1 | 0.1 |
| 1173 | 7 | 7 | 7 | 7 | 7 | 7 | 7 |
| viscosity (mPa·s/25°C) | 25 | 30 | 38 | 22 | 23 | 28 | 30 |
| PII value | A | A | A | A | A | A | A |
| hardness (pencil) | H | H | H | H | H | H | H |
| adhesion (to Al) | A | A | A | A | A | A | A |
| adhesion (to Pc) | 100/100 | 100/100 | 100/100 | 100/100 | 100/100 | 100/100 | 100/100 |
| corrosion resistance | A | A | A | A | A | A | A |

FIG. 2

| | Inventive example 8 | Comparative example 1 | Comparative example 2 | Comparative example 3 | Comparative example 4 | Comparative example 5 |
|---|---|---|---|---|---|---|
| 3EO-TMPTA | 60 | 100 | 70 | 40 | 30 | 10 |
| MANDA | | | | 40 | | |
| PHOTOMER 4160 | 30 | | | | 50 | 80 |
| PO-A | 10 | | 30 | | | 10 |
| M-101 | | | | | | |
| THFA | | | | 20 | 20 | |
| PM-2 | 0.1 | 0.1 | 0.1 | 0.1 | 0.1 | 0.1 |
| 1173 | 7 | 7 | 7 | 7 | 7 | 7 |
| viscosity (mPa·s/25°C) | 33 | 80 | 40 | 22 | 21 | 20 |
| PII value | A | A | A | B | B | A |
| hardness (pencil) | H | 2H | F | H | H | HB |
| adhesion (to Al) | A | B | B | A | A | A |
| adhesion (to Pc) | 100/100 | 0/100 | 100/100 | 100/100 | 100/100 | 100/100 |
| corrosion resistance | A | B | B | A | A | A |

FIG. 3

| | Inventive example 9 | Inventive example 10 | Inventive example 11 | Inventive example 12 | Inventive example 13 | Inventive example 14 | Inventive example 15 |
|---|---|---|---|---|---|---|---|
| 3EO-TMPTA | 50 | 50 | 50 | 50 | 50 | 50 | 50 |
| MANDA | 30 | 30 | 30 | 30 | 30 | 30 | 30 |
| PO-A | 20 | 20 | 20 | 20 | 20 | 20 | 20 |
| PM-2 | 0.1 | 0.1 | 0.1 | 0.1 | 0.1 | 0.1 | 0.1 |
| BP100 | | | | | | | |
| OBM | 1 | 2 | 4 | 4 | 5 | 6 | 10 |
| DAA-P | 4 | 4 | 4 | 8 | 5 | 2 | 5 |
| viscosity (mPa·s/25°C) | ○ | ○ | ○ | ○ | ○ | ○ | ○ |
| PII value | A | A | A | A | A | A | A |
| hardness (pencil) | H | H | H | H | H | H | H |
| adhesion (to Al) | A | A | A | A | A | A | A |
| adhesion (to Pc) | 100/100 | 100/100 | 100/100 | 100/100 | 100/100 | 100/100 | 100/100 |
| corrosion resistance | A | A | A | A | A | A | A |
| appearance | ○ | ○ | ○ | ○ | ○ | ○ | ○ |
| smell | ○ | ○ | ○ | ○ | ○ | ○ | ○ |

FIG. 4

| | Inventive example 16 | Inventive example 17 | Inventive example 18 | Inventive example 19 | Inventive example 20 | Inventive example 21 |
|---|---|---|---|---|---|---|
| 3EO-TMPTA | 50 | 50 | 50 | 50 | 50 | 50 |
| MANDA | 30 | 30 | 30 | 30 | 30 | 30 |
| PO-A | 20 | 20 | 20 | 20 | 20 | 20 |
| PM-2 | 0.1 | 0.1 | 0.1 | 0.1 | 0.1 | 0.1 |
| BP100 | 2 | 3 | 4 | 5 | 5 | 10 |
| OBM | | | | | | |
| DAA-P | 2 | 6 | 8 | 1 | 5 | 5 |
| viscosity (mPa·s/25°C) | ○ | ○ | ○ | ○ | ○ | ○ |
| PII value | A | A | A | A | A | A |
| hardness (pencil) | H | H | H | H | H | H |
| adhesion (to Al) | A | A | A | A | A | A |
| adhesion (to Pc) | 100/100 | 100/100 | 100/100 | 100/100 | 100/100 | 100/100 |
| corrosion resistance | A | A | A | A | A | A |
| appearance | ○ | ○ | ○ | ○ | ○ | ○ |
| smell | ○ | ○ | ○ | ○ | ○ | ○ |

F/G. 5

| | Inventive example 22 | Inventive example 23 | Inventive example 24 | Inventive example 25 | Comparative example 6 | Comparative example 7 |
|---|---|---|---|---|---|---|
| 3EO-TMPTA | 50 | 50 | 50 | 50 | 50 | 50 |
| MANDA | 30 | 30 | 30 | 30 | 30 | 30 |
| PO-A | 20 | 20 | 20 | 20 | 20 | 20 |
| PM-2 | 0.1 | 0.1 | 0.1 | 0.1 | 0.1 | 0.1 |
| SA200 | 0.5 | 1.0 | 0.01 | 0.1 | | |
| BP100 | 5 | 5 | 5 | 6 | 5 | 5 |
| OBM | | | | | | |
| DAA-P | 3 | 5 | 3 | 6 | 5 | 5 |
| SM11 | | | | | 0.1 | |
| NewCal.1607 | | | | | | 0.1 |
| viscosity (mPa·s/25°C) | ○ | ○ | ○ | ○ | ○ | ○ |
| PII value | A | A | A | A | A | A |
| hardness (pencil) | ○ | ○ | ○ | ○ | ○ | ○ |
| adhesion (to Al) | A | A | A | A | A | A |
| adhesion (to Pc) | 100/100 | 100/100 | 100/100 | 100/100 | 100/100 | 100/100 |
| corrosion resistance | A | A | A | A | A | A |
| defoaming property | ○ | ○ | ○ | ○ | × | ○ |
| surface tension | ○ | ○ | ○ | ○ | ○ | × |

ULTRAVIOLET CURING RESIN HAVING LOW PRIMARY IRRITATION INDEX FOR OPTICAL DISK

This is a continuation of application Ser. No. 08/355,691, filed Dec. 14, 1994, now abandoned.

BACKGROUND OF THE INVENTION

The present invention relates to an ultraviolet curing resin suitable for use in a protective film of an optical disk such as a compact disk, a magneto-optical disk or the like.

An optical disk such as the compact disk, the magneto-optical disk or the like has a structure including a metal thin film layer formed by or evaporation or sputtering on a transparent substrate made of a material such as polycarbonate or the like. Since the metal thin film layer is easily deteriorated in characteristics because of influence of oxygen and vapor in the air, an ultraviolet curing resin and so on are used as the protective film. A spin coating method is generally employed as a coating method therefor.

As a film thickness of the protective film for a recording layer of the optical disk becomes thick, a substrate of the disk tends to be warped. Accordingly, a reproducing apparatus misreads or is prevented from reading the recorded information. Therefore, the film thickness of the protective film should be set thinner. For this end, a composition to be coated used in the spin coating method should have low viscosity.

However, since particularly a compound having low molecular weight and low viscosity used in a light curing resin material generally has a high primary irritation index (PII) value, there is often reported the problem that a maintenance person for a manufacturing apparatus touches the light curing resin material and then gets a rash.

A protective coating agent for an optical disk used to reduce skin irritations is proposed in Japanese laid-open publication No. 2-6562. The protective coating agent includes a compound made by denaturing an acrylate compound having low molecular weight with an ethylene oxide, such as an adduct of a trimethylolpropane triacrylate with 3-mol ethylene oxide. However, the protective coating agent for the optical disk is encountered by the problem that it has high viscosity because of its high molecular weight.

If the PII value of the compound is set lower, then the compound is lowered in a corrosion resistance and cannot serve as the protective film. Further, the protective film having the low PII value is encountered by the problem that after the compound is cured, it strongly stinks to aggravate the working conditions.

Indeed, it is desirable in view of productivity that the coating agent has low viscosity and low surface tension which improves a wetting property relative to a disk substrate. But, since bubbles are easily produced because of an additive added in order to lower the surface tension of the coating agent, there is then the problem of aggravation of the productivity such as frequent production of substandard disks, low yield and so on. Further, since the additive oozes onto the protective film, there is then the problem that print adhesion is lowered to cause disadvantages such as detachment of a printing ink therefrom or the like.

SUMMARY OF THE INVENTION

The present invention is made in view of the above-mentioned problems. An object of the present invention is to obtain an ultraviolet curing resin having low skin irritations.

Another object of the present invention is to obtain an ultraviolet curing resin which has excellent property when it is used as a protective film and stinks little after it is cured.

A further another object of the present invention is to obtain an ultraviolet curing resin which generates fewer bubbles and has low surface tension.

The ultraviolet curing resin according to the present invention comprises methacrylate and/or acrylate of a total of 30 to 60 parts by weight each having the PII value of 2 or less and three functional groups or more, bifunctional methacrylate and/or bifunctional acrylate of a total of 20 to 50 parts by weight each having the PII value of 2 or less, methacrylate and/or acrylate of a total of 5 to 25 parts by weight each having the PII value of 2 or less, dimethacrylate having a functional group and/or diacrylate having a functional group, and a photopolymerization initiator.

The ultraviolet curing resin according to the present invention is an ultraviolet curing resin in which the acrylate having three functional groups or more is a trimethylolpropane triacrylate denatured with ethylene oxide.

The ultraviolet curing resin according to the present invention is the above ultraviolet curing resin in which the bifunctional acrylate is a neopentylglycol diacrylate hydroxypivalate.

The ultraviolet curing resin according to the present invention is the above ultraviolet curing resin in which the bifunctional acrylate is a neopentylglycol diacrylate denatured with ethylene oxide.

The ultraviolet curing resin according to the present invention is the above ultraviolet curing resin in which the acrylate is phenoxyethyl acrylate and/or phenoxydiethyleneglycol acrylate.

The ultraviolet curing resin according to the present invention is the above ultraviolet curing resin in which the photopolymerization initiator is a 2-hydroxy-2-methyl-1-phenylpropane-one.

The ultraviolet curing resin according to the present invention is the above ultraviolet curing resin in which the dimethacrylate having a functional group is dimethacrylate phosphate denatured with ethylene oxide.

The ultraviolet curing resin according to the present invention comprises methacrylate and/or acrylate of a total of 30 to 60 parts by weight each having the PII value of 2 or less and three functional groups or more, bifunctional methacrylate and/or bifunctional acrylate of a total of 20 to 50 parts by weight each having the PII value of 2 or less, methacrylate and/or acrylate of a total of 5 to 25 parts by weight each having the PII value of 2 or less, dimethacrylate having a functional group and/or diacrylate having a functional group, bifunctional dimethylsiloxane of 0.01 to 1.0 parts by weight, and the photopolymerization initiator of 5 to 15 parts by weight.

The ultraviolet curing resin according to the present invention is the above ultraviolet curing resin in which the photopolymerization initiator is a mixture of paradimethylaminoacetophenone and methyl orthobenzoylbenzoate and a weight percentage ratio of them is within the range from 25:75 to 80:20.

The ultraviolet curing resin according to the present invention is the above ultraviolet curing resin in which the photopolymerization initiator is a mixture of paradimethylaminoacetophenone and benzophenone and a weight percentage ratio of them is within the range from 17:83 to 67:33.

BRIEF DESCRIPTION OF THE DRAWINGS

FIG. 1 is a table showing evaluated results of samples of inventive examples 1 to 7;

FIG. 2 is a table showing evaluated results of samples of inventive example 8 and comparative examples 1 to 5;

FIG. 3 is a table showing evaluated results of samples of inventive examples 9 to 15;

FIG. 4 is a table showing evaluated results of samples of inventive examples 16 to 21; and FIG. 5 is a table showing evaluated results of samples of inventive examples 22 to 25 and comparative examples 6 and 7.

DESCRIPTION OF THE PREFERRED EMBODIMENT

An ultraviolet curing resin according to an embodiment of the present invention will hereinafter be described.

Abbreviations of respective compositions used in inventive examples and comparative examples are as follows.
(Abbreviation) (Composition)

3EO-TMPTA: trimethylolpropane triacrylate denatured with ethylene oxide (manufactured by SHIN-NAKAMURA CHEMICAL CO., LTD.)

MANDA: neopentylglycol acrylate hydroxypivalate (manufactured by NIPPON KAYAKU CO., LTD.)

PHOTOMER 4160: neopentylglycol diacrylate denatured with ethylene oxide (manufactured by SAN NOPCO Ltd.)

PO-A: phenoxyethyl acrylate (manufactured by KYOE-ISHA OILS & FATS CO., LTD.)

M-101: phenoxydiethleneglycol acrylate (manufactured by TOAGOSEI CHEMICAL INDUSTRY CO., LTD.)

THFA: tetrahydrofurfuryl acrylate (manufactured by OSAKA ORGANIC CHEMICAL CO., LTD)

PM-2: dimethacrylate phosphate denatured with ethylene oxide (NIPPON KAYAKU CO., LTD.)

DAROCURE 1173: 2-hydroxy-2-methyl-1-phenylpropane-1-one (manufactured by MERCK & CO.)

INVENTIVE EXAMPLE 1

The 3EO-TMPTA of 40 parts by weight and the MANDA of 40 parts by weight, the PO-A of 20 parts by weight, the PM-2 of 0.1 parts by weight and the DAROCURE 1173 of 7 parts by weight were used as multifunctional acrylate (and/or multifunctional methacrylate), a diluent, an adhesion promotor and an initiator, respectively. These materials were uniformly mixed to manufacture a coating agent.

INVENTIVE EXAMPLE 2

A coating agent is manufactured similarly to inventive example 1 except that the M-101 was used as the diluent instead of the PO-A used in inventive example 1.

INVENTIVE EXAMPLE 3

The 3EO-TMPTA of 50 parts by weight and the MANDA of 45 parts by weight were used as the multifunctional acrylate (and/or the multifunctional methacrylate), and the Po-A of 5 parts by weight as the diluent. Other materials are the same as those in inventive example 1.

INVENTIVE EXAMPLE 4

The 3EO-TMPTA of 40 parts by weight and the MANDA of 35 parts by weight were used as the multifunctional acrylate (and/or the multifunctional methacrylate), and the PO-A of 25 parts by weight as the diluent. Other materials were the same as those in inventive example 1.

INVENTIVE EXAMPLE 5

The 3EO-TMPTA of 30 parts by weight, the Photomer 4160 of 50 parts by weight, the PO-A of 20 parts by weight, the PM-2 of 0.1 part by weight and the 1173 of 7 parts by weight are used as trifunctional acrylate (and/or trifunctional methacrylate), bifunctional acrylate (and/or bifunctional methacrylate), the diluent, an adhesion promotor and an initiator, respectively. These materials were uniformly mixed to manufacture a coating agent.

INVENTIVE EXAMPLE 6

A coating agent was manufactured similarly to inventive example 5 except that the 3EO-TMPTA and the Photomer 4160 used in inventive example 5 are changed to those of 50 parts by weight and 30 parts by weight, respectively.

INVENTIVE EXAMPLE 7

A coating agent was manufactured similarly to inventive example 5 except that the 3EO-TMPTA and the Photomer 4160 used in inventive example 5 are changed to those of 60 parts by weight and 20 parts by weight, respectively.

INVENTIVE EXAMPLE 8

A coating agent was manufactured similarly to inventive example 5 except that the 3EO-TMPTA, the Photomer 4160 and the PO-A used in inventive example 5 were changed to those of 60 parts by weight, 30 parts by weight and 10 parts by weight, respectively.

Comparative Example 1

The 3EO-TMPTA of 100 parts by weight, the PM-2 of 0.1 parts by weight as the adhesion promotor, and the 1173 of 7 parts by weight as the initiator were mixed to manufacture a coating agent.

Comparative Example 2

A coating agent was manufactured similarly to comparative example 1 except that of the 3EO-TMPTA of 100 parts by weight, 30 parts by weight thereof is substituted for the PO-A as the diluent.

Comparative Example 3

A coating agent was manufactured similarly to inventive example 1 except that the diluent used in inventive example 1 is changed to the THFA.

Comparative Example 4

A coating agent was manufactured similarly to inventive example 5 except that the diluent used in inventive example 5 was changed to the THFA.

Comparative Example 5

The 3EO-TMPTA of 10 parts by weight, the Photomer 4160 of 80 parts by weight and the PO-A of 10 parts by weight were used to manufacture a coating agent.

Material properties of compositions of the above inventive and comparative examples are evaluated as follows.
conditions of ultraviolet ray radiation
measurement of viscosity Viscosity of each of the materials of the above inventive and comparative examples at 25° C. was measured by using a viscometer of cone plate type manufactured by Harke Co., Ltd., in which a sensor system, a measuring system and a sensor were PK100, Rotovisco RV20-M5 and PK5, 1°, respectively. A cubic volume of each sample of the above inventive and comparative examples was set to 0.5 cm$^3$, and a shear rate was set to 1000 s$^{-1}$.

skin irritations

Estimated mean weight values were calculated from the PII values of the samples as follows: estimated mean weight value=PII of tri-(meth)acrylate-functional monomer)×(wt % of tri(meth)acrylate-functional monomer)+(PII of bi-(meth)acrylate-functional monomer)×(wt % of bi(meth)acrylate-functional monomer)+(PII of mono(meth)acrylate-functional monomer)×(wt % of mono(meth)acrylate-functional monomer) and weight percentages of the compositions of the samples. As shown in Table 1, the skin irritations of the samples were evaluated on the basis of the above mean weight values. The mean weight values were classified within a range from 0 to 8, in which the smaller value the sample has, the lower skin irritations it has.

TABLE 1

| PII value | evaluation |
| --- | --- |
| 6 to 8 | C causes an extensive rash to maintenance persons. |
| 2 to 5 | B causes a rash to maintenance persons. |
| 2 or less | A causes little or no rash to maintenance persons. | hardness measured by using a pencil

Each sample was coated on a glass plate by using a coil bar #12 and then was radiated with ultraviolet rays under the above conditions to obtain a cured film. A pencil under the trade name of Mitsubishi Uni was used to measure hardness of a surface of each cured film in accordance with JIS (Japanese Industrial Standard) K5400.

adhesion (1) adhesion to a metal thin film layer formed by evaporation or sputtering The ultraviolet curing resin compositions of inventive and comparative examples were coated by spin coating on polycarbonate substrates with their diameters of 12 cm and thickness of 1.2 mm, on each of which aluminum (Al) was evaporated, and then cured by radiation of the ultraviolet rays under the above conditions to then form protective films with their thickness of about 7 µm thereon. In this case, a spin-coater manufactured by Mikasa Co., Ltd. under the trade name of MIKASA SPINCOATER 1H-DXII was used. Its rotation number was set to 3000 RPM and a severing time was changed depending upon viscosity of the composition to control its film thickness to be uniform.

With a cutter knife, the cured films of the samples fabricated as described above were scored to an extent that the cutter reached the aluminum-evaporated films thereof. Scotch tapes were bonded to the cured films along the scores and kept perpendicular to the surfaces of the coated cured films at their one ends. Then, the scotch tapes were peeled off therefrom instantaneously. When the cured film was peeled off together with the aluminum evaporated film, an adhesion of the sample is evaluated with a level "A". When the cured film is peeled off from the aluminum evaporated film and then substantially half of the aluminum evaporated film was left on a PET film, the adhesion was evaluated with a level "B". When the aluminum-evaporated film was completely left on the PET film, the adhesion was evaluated with a level "C".

(2) adhesion to a polycarbonate board

The cured film of each of the samples, which was coated on the polycarbonate substrate by the spin coating as described above, was scored to an extent that the cutter reached the polycarbonate substrate thereof, with being divided into 100 pieces in a checked pattern. A scotch tape was bonded to the cured film with being kept perpendicular to the coated cured surface at its one end. Then, the scotch tape was peeled off instantaneously. An adhesion of the sample was evaluated with the number of checkered pieces of the cured film left on the polycarbonate substrate.

corrosion resistance

The samples coated by the spin coating on the aluminum-evaporated polycarbonate substrates with their diameters of 12 cm and thickness of 1.2 mm are left in an oven at 60° C. and with 95% RH for 100-hour aging. There was measured an increased amount of pinholes caused by corrosion of the Al layer with respect to each of the samples. The above pinhole is as follows. Metal aluminum is used as a reflection film of a compact disk, for example, and a dielectric film, a magneto-optical recording film, a dielectric film, and a reflection film (Al layer) are successively formed on a substrate of the a magneto-optical disk. Since these films formed by the sputtering are corroded by oxygen and vapor in the air very easily, a protective film made of an organic material is coated on the films formed by the sputtering. An inorganic layer made of an inorganic material such as the Al layer or the like is sandwiched between the substrate and the protective film. When a light is emitted from a light source toward a lower surface of the disk and the disk is viewed from the side of its upper surface, the light is usually blocked by the opaque inorganic layer and prevented from being viewed from the upper side of the disk. However, when the disk which has been left under the condition of high temperature and high humidity is viewed similarly, the light, which should be blocked by the opaque inorganic layer in the former case, can be viewed through a transparent circular aperture formed by corrosion. Such aperture is referred to as the pinhole.

In the inventive examples, size of the pinhole was classified into classes of a range from 0 to 10 µm, a range from 10 to 30 µm, a range from 30 to 50 µm, a range from 50 to 100 µm and a range of 100 µm or more. When there was observed the pinhole with its size of 100 µm or more or the pinhole which was being corroded with its size of the range from 50 to 100 µm, such pinhole was regarded as the pinhole. The samples were evaluated with respect to the corrosion on the basis of the number of the pinholes.

TABLE 2

| increased amount of pinholes | evaluation |
| --- | --- |
| 100 pinholes or more | C |
| 10 to 100 pinholes | B |
| 10 pinholes or less | A |

FIGS. 1 and 2 show results in which the samples of the inventive examples 1 to 8 and the comparative examples 1 to 5 are evaluated with respect to the above items.

An evaluated result of the sample of the inventive example 1 reveals that the coating agent satisfactory in all the items was obtained since its viscosity was marked with 25 mPa. s/25° C., its PII value a level A, its hardness a level H, its adhesion (to Aluminum) a level A, its adhesion (to Polycarbonate) a value of 100/100 and its corrosion resistance a level A. Since the sample of the inventive example 1 includes the MANDA of 40 parts by weight, its adhesion (to Al) and its corrosion resistance were improved as compared with the sample of the comparative example 2.

The sample of the inventive example 2 employs the M-101 of 20 parts by weight having a structural formula similar to that of the PO-A instead of the PO-A used in the inventive example 1. While the viscosity of the sample of the inventive example 2 became slightly larger from 25 mPa.s/25° C. to 30 mPa. s/25° C. as compared with the sample of the inventive example 1, the sample of the inventive example 2 has satisfactory evaluation results as a coating agent in other items similarly to the sample of the inventive example 1.

The samples of the inventive examples 3 and 4 include the 3EO-TMPTA of 40 to 50 parts by weight, the MANDA of 35 to 45 parts by weight and the PO-A of 5 to 25 parts by weight which are changed in amount in comparison with the sample of the inventive example 1. The samples have satisfactory evaluation results in all the items similarly to that of the inventive example 1 except that their viscosities are slightly changed.

The samples of the inventive examples 5 to 8 are also the coating agents satisfactory in all the evaluation items.

On the other hand, as clear from FIGS. 1 and 2, the coating agent of the comparative example 1 has high viscosity and high crosslinking density, so that the coating agent is unsatisfactorily adhered to the polycarbonate.

Therefore, a test in resistance to environment reveals that many corroded portions of the metal thin film layer are observed at an outer periphery of the disk substrate.

The coating agent of the comparative example 2 has low hardness because it includes monofunctional monomer of 30 parts by weight, being unsatisfactorily adhered to the metal thin film layer (Al layer) because it includes large amount of the 3EO-TMPTA.

Employing the THFA having the high PII value as the diluent, the coating agent of the comparative example 3 has a higher PII value as compared with those of the inventive examples 1 and 2.

Employing the THFA having the high PII value as the diluent similarly to the comparative example 3, the coating agent of the comparative example 4 has a higher PII value as compared with those of the inventive examples 5 to 8.

The coating agent of the comparative example 5 has low hardness, so that it is not satisfactory in resistance to scratch.

As described above, as shown in the inventive examples 1 to 8, there can be provided optical-disk materials which have the low PII value and the low viscosity and are quickly cured by the ultraviolet ray irradiation and excellent in adhesion and hardness and from which the protective film excellent in corrosion of the metal thin film layer can be obtained.

The following multifunctional acrylate monomers (and/or multifunctional methacrylate monomers) with the PII values of 2 or less can be used in the present invention: for example, allylated cyclohexyl diacrylate, bisphenol A diacrylate denatured with ethylene oxide (EO), bisphenol A diacrylate denatured with propylene oxide (PO), dipentaerythritol hexaacrylate, dipentaerythritol pentaacrylate denatured with alkyl, dipentaerythritol tetraacrylate denatured with alkyl, dipentaerythritol triacrylate denatured with alkyl, dipentaerythritol hexaacrylate denatured with caprolactone, 1,6-hexanediol dimethacrylate, neopentylglycol diacrylate, neopentylglycol diacrylate hydroxypivalate, polyethyleneglycol diacrylate, trimethylolpropane diacrylate denatured with neopentylglycol, neopentylglycol diacrylate denatured with EO, neopentylglycol diacrylate denatured with PO, 1,9-nonanediol diacrylate, 2-hydroxy-1,3-dimethacryloxy propane, pentaerythritol tetraacrylate, trimethylolpropane triacrylate denatured with EO, trimethylolpropane triacrylate denatured with PO, diethyleneglycol dimethacrylate, tripropyleneglycol diacrylate, polypropyleneglycol diacrylate, triacrylate denatured with EO isocyanurate, and so on. These multifunctional acrylate monomers (and/or multifunctional methacrylate monomers) preferably have the PII values not exceeding 2 because of rash caused by their skin irritations and so on. It is preferable to use these compounds within a range in which proportion of each of the compounds becomes 75 to 95 parts by weight, more preferably, 80 to 90 parts by weight. However, when the compounds having three double bonds or more based on photopolymerization, such as dipentaerythritol hexaacrylate, dipentaerythritol pentaacrylate denatured with alkyl, dipentaerythritol tetraacrylate denatured with alkyl, dipentaerythritol triacrylate denatured with alkyl, dipentaerythritol hexaacrylate denatured with caprolactone, and trimethylolpropane triacrylate denatured with ethylene oxide or propylene oxide, for example, are used to an extent that their proportions of use exceed 70 parts by weight, the coated films formed of the coating agents made of the above compounds are not preferable because shrink caused by curing and strain become large to aggravate its adhesion to the base material and weathering resistance is lowered. Therefore, when one kind or two kinds or more of the above-mentioned bifunctional acrylate monomers (and/or bifunctional methacrylate monomers) are blended with the compound having three double bonds or more based on photopolymerization, there can be preferably obtained the coating agent more excellent in adhesion and hardness as compared with one made of only the bifunctional acrylate monomer (and/or bifunctional methacrylate monomer). It is preferable to use these multifunctional acrylate monomers (and/or multifunctional methacrylate monomers) to an extent that the compound having three double bonds or more based on the photopolymerization is within the range from 20 to 70 parts by weight, more preferably, 30 to 60 parts by weight and the compound having two double bonds based on the photopolymerization is within the range from 5 to 75 parts by weight, more preferably, 20 to 50 parts by weight.

The trifunctional acrylate (and/or the trifunctional methacrylate) denatured with ethylene oxide used in the present invention includes, for example, trimethylolpropane triacrylate (manufactured by Shin-Nakamura Chemical Co., Ltd. under the trade name of NK ester A-TMPA-3EO) and so on. It is not preferable to use the trifunctional acrylate (and/or the trifunctional methacrylate) of 70 parts by weight or more for a coating agent to form a coated film because the coated film has large shrink caused by the curing, the large strain, unsatisfactory adhesion to the substrate and unsatisfactory weathering resistance. When the trifunctional acrylate (and/or the trifunctional methacrylate) of 20 parts by weight or less is used for a coating agent to form a coated film, the coated film is easily scratched and lowered in hardness of its surface. Therefore, it is preferable to use the trifunctional acrylate (and/or the trifunctional methacrylate) of 20 to 70 parts by weight, more preferably, 30 to 60 parts by wight.

The bifunctional acrylate (and/or the bifunctional methacrylate) denatured with ethylene oxide used in the present invention includes, for example, neopentylglycol diacrylate (manufactured by SAN NOPCO Ltd. under the trade name of Photomer 4160), 1,6-hexanediol diacrylate (manufactured by SAN NOPCO Ltd. under the trade name of Photomer 4017) and so on. It is preferable to use the bifunctional acrylate (and/or the bifunctional methacrylate) of 5 to 75 parts by weight, more preferably, 20 to 50 parts by weight.

The acrylate (and/or the methacrylate) used in the present invention, which has the PII value of 2 or less and high dilution effect with its viscosity at 25° C. of 20 mPa.s or less and can serve as a protective film for a recording layer of the optical disk in view of performance, includes, for example, 1,4-butanediol dimethacrylate, 1,3-butyleneglycol dimethacrylate, diethyleneglycol dimethacrylate, ethyleneglycol dimethacrylate, neopentylglycol dimethacrylate, neopentylglycol diacrylate hydroxypivalate, polyethyleneglycol dimethacrylate, tetraethyleneglycol dimethacrylate, triethyleneglycol dimethacrylate, tripropyleneglycol diacrylate, phenoxydiethyleneglycol acrylate, phenoxydiethyl acrylate, isobornyl acrylate, morpholine acrylate, tetrahydrofurfuryl methacrylate, dicyclopentanyl methacrylate, dicyclopentenyloxyethyl methacrylate, laurylacrylatestearyl methacrylate (or laurylmethacrylatestearyl methacrylate), polypropyleneglycol methacrylate, 2-ethylhexyl methacrylate, 2-ethoxyethyl methacrylate and so on.

The phenoxyethyl acrylate or the phenoxydiethyleneglycol acrylate used in the present invention is a component having a dilution property (low viscosity) and low skin irritations. Accordingly, if the component of 25 parts by weight or more is used as a coating agent to form a coated film, the coated film is prevented from being easily cured at its film surface and also from having satisfactory hardness. It is not preferable to use the component of less than 5 parts by weight because its dilution effect becomes small. Therefore, it is preferable to use the above dilution monomer of 5 to 25 parts by weight.

A photopolymerization initiator used in the present invention includes, for example, initiators of acetophenone system, benzoin system, benzophenone system, thioxanthone system and other special group. The initiators of acetophenone system and benzoin system are used individually. The initiators of benzophenone system and thioxanthone system are used together with photoinitiation assistant. In this case, materials of amine class, sulfone class, phosphine class and so on can be used as the photoinitiation assistant.

There are two kinds of photopolymerization initiators classified by radical generating mechanism based on difference of chemical structure (molecular binding energy), i.e., molecular bond cleavage type (P1 type) and hydrogen intermolecular abstraction type (P2 type). The photopolymerization initiators of P1 type are those of acetophenone system and benzoin system, and those of P2 type are those of benzophenone system and thioxanthone system.

To speak concretely, the photopolymerization initiator of acetophenone system includes, for example, diethoxyacetophenone (under the trade name of DEAP), 2-hydroxy-2-methyl-1-phenylpropane-1-one (under the trade name of DAROCURE 1173), 1-hydroxycyclohexylphenylketone (under the trade name of Irgacure 184), 2-methyl-1-[4-(methylthio)phenyl]-2- morpholinopropane-1 (under the trade name of IRGACURE 907) and so on.

On the other hand, the photopolymerization initiator of benzoin system includes, for example, benzoin (under the trade name of-SAYCUOLE Z), benzoinmethyl ether (under the trade name of NISSOCURE MBO), benzoinethyl ether (under the trade name of SAYCUOLE BEE), benzoinisopropyl ether (under the trade name of BIP), benzoinisobutyl ether (under the trade name of SAYCUOLE BBI), benzyldimethylketal (under the trade name of IRGACURE 651) and so on.

The photopolymerization initiator of benzophenone system includes, for example, benzophenone (under the trade name of KAYACURE BP), methyl benzoylbenzoate (under the trade name of JUBISORATOR 250), 4-phenylbenzophenone (under the trade name of TRIGONAL 12), hydroxybenzophenone (under the trade name of UVECRYL P-36), 4-benzoyl-4'-methyldiphenylsurfide (under the trade name of QUANTACURE BMS), 3.3'-dimethyl-4-methoxybenzophenon (under the trade name of KAYACURE MBP) and so on.

The photopolymerization initiator of thioxanthone system includes, for example, thioxanthone (under the trade name of Nissocure TX), 2-chlorthioxanthone (under the trade name of Kayacure CTX), 2-methylthioxanthone (under the trade name of Nissocure MTX), 2,4-dimethylthioxanthone (under the trade name of Kayacure RTX), isopropylthioxanthone (under the trade name of Quantacure ITX), 2,4-dichlorthioxanthone (under the trade name of Kayacure CTX), 2,4-diethylthioxanthone (under the trade name of Kayacure DETX), 2,4-diisopropylthioxanthone (under the trade name of Kayacure DITX) and so on.

The photopolymerization initiator of other special group includes, for example, 1-phenyl-1,2-propanedione-2-(O-ethoxycarbonyl)oxime (under the trade name of Quantacure PDO), acylphosphine oxide (under the trade name of Rucyline TPO), methylphenylglyoxylate (under the trade name of Bicure 55), benzyl (under the trade name of Saycuole BZ), camphorquinone (manufactured by Tokyo Kasei CO., Ltd. and so on), dibenzosuberone (under the trade name of Quantacure DBS), 2-ethylanthraquinone (manufactured by BASF CO., Ltd.), 3,3', 4,4'-tetra(t-butylperoxycarbonyl)benzophenone (under the trade name of BTTB) and so on.

The photopolymerization initiator is limited in parts by weight to 0.2 to 20 parts by weight within 100 parts by weight of composition according to the present invention.

Further, the photoinitiation assistant of benzophenone system and thioxanthone system includes, for example, triethanolamine, methyldiehtanolamine, triisopropanolamine, 4,4-dimethylaminobenzophenone, 4,4'-diethylaminobenzophenone, 2-ethyl dimethylaminobenzoate, 4-ethyl dimethylaminobenzoate, 4-(n-butoxy)ethyl dimethylaminobenzoate, 4-isoamyl dimethylaminobenzoate, 4-dimethylaminobenzoate acid, 2-ethylhexyl and so on. It is preferable to use these photoinitiation assistants of 0.1 to 10 parts by weight of that of the photopolymerization initiator.

Different kinds of the photopolymerization initiators of P1 type may be used together, and the photopolymerization initiators of P1 and P2 types can be used together.

The ultraviolet curing coating agent for the optical disk according to the present invention can sufficiently achieve the expected objects of the present invention only with the above-mentioned component materials. However, in order to further improve the property of the coating agent, the coating agent, without changing an inherent property thereof, can be added with the following publicly known components, i.e., an additive of proper amount such as a leveling agent, an ultraviolet absorbing agent, an oxidation inhibitor, a silane coupling agent, a silicone oil, an adhesion promotor or the like.

The adhesion deeply concerned with corrosion can be further improved by addition of an adhesion promotor such as, for example, acrylate (and/or methacrylate) having carboxyl group, phosphoric group or hydroxyl group as well as acrylate succinate (and/or methacrylate succinate) denatured with ethylene oxide, acrylate phthalate (and/or methacrylate phthalate) denatured with ethylene oxide, acrylate phosphate (and/or methacrylate phosphate) denatured with ethylene oxide. The adhesion promotor of 0,1 to 5 parts by weight should be used when parts by weight of the composition according to the present invention is 100 parts by weight.

The ultraviolet curing coating agent according to the present invention is manufactured by mixing the above-mentioned respective components with a general mixing method. When the coating agent according to the present invention is used to form a protective coating layer on the optical disk, the mixed coating agent is filtered by a membrane filter with its thickness of 0.2 μm. Then, the mixed coating agent is coated on the disk by the spin coater in a clean room so as to have a thickness of 5 to 10 μm, being cured by radiation of the ultraviolet rays.

A lamp such as a high-pressure mercury lamp, a metal halide lamp, a nonelectrode lamp or the like can be used as light source for the ultraviolet rays used in the present invention. Instead of the ultraviolet rays, electron beam can be radiated to cure the material for the optical disk in the methods using the above lamps.

As described above, when the coating agent according to the present invention is used to form the cured, coated film, the film has the low skin irritations and low viscosity and is quickly cured by the ultraviolet rays and further excellent in hardness of its surface, adhesion and corrosion resistance as the protective film for the optical disk substrate.

As described above, according to these inventive examples 1 to 8, since a total of 100 parts by weight of the multifunctional acrylate (and/or the multifunctional methacrylate) of 75 to 95 parts by weight having the PII value of 2 or less, the phenoxyethyl acrylate or phenoxydiethyleneglycol acrylate of 5 to 25 parts by weight and the photopolymerization assistant of 0.2 to 20 parts by weight per the above 100 parts by weight are mixed, the coating agent having low skin irritations and low viscosity can be obtained, whereby a maintenance person of the disk manufacturing apparatus is prevented from getting a rash and its satisfactory coating property leads to satisfactory workability in view of manufacturing. Further, the coating agent is quickly cured by the ultraviolet rays and excellent in adhesion and hardness. Since the test in resistance to environment reveals that the protective film made of the coating agent is excellent in protection from corrosion of the metal thin film layer, reliability of the disk can be improved.

Subsequently, another inventive examples of the ultraviolet curing resins according to the present invention will be explained.

Abbreviations of compositions used in another inventive examples are as follows in addition to the abbreviations used in the above-described inventive.

(Abbreviation) (Composition)

BP100: benzophenone
OBM: methyl orthobenzoylbenzoate
DAA-P paradimethylaminoacetophenone Mixture ratios of materials of inventive examples 9 to 21 are as follows.

In each of the inventive examples 9 to 21, the 3EO-TMPTA of 50 parts by weight and the Photomer 4160 of 30 parts by weight as the multifunctional acrylate, the PO-A of 20 parts by weight as the diluent and the PM-2 of 0.1 part by weight as the adhesion promotor were mixed to prepare a base, i.e., the same base as described in the inventive example 6.

INVENTIVE EXAMPLE 9

The OBM of 1 part by weight and the DAA-P of 4 parts by weight as the polymerization initiator and the base were uniformly dissolved and stirred by a dissolving apparatus with a stirred to produce a coating agent.

INVENTIVE EXAMPLE 10

The OBM of 2 parts by weight and the DAA-P of 4 parts by weight as the polymerization initiator and the base were uniformly dissolved and stirred by a dissolving apparatus with a stirrer to produce a coating agent.

INVENTIVE EXAMPLE 11

The OBM of 4 parts by weight and the DAA-P of 4 parts by weight as the polymerization initiator and the base were uniformly dissolved and stirred by the dissolving apparatus with the stirrer to produce a coating agent.

INVENTIVE EXAMPLE 12

The OBM of 4 parts by weight and the DAA-P of 8 parts by weight as the polymerization initiator and the base were uniformly dissolved and stirred by the dissolving apparatus with the stirrer to produce a coating agent.

INVENTIVE EXAMPLE 13

The OBM of 5 parts by weight and the DAA-P of 5 parts by weight as the polymerization initiator and the base were uniformly dissolved and stirred by the dissolving apparatus with the stirrer to produce a coating agent.

INVENTIVE EXAMPLE 14

The OBM of 6 parts by weight and the DAA-P of 2 parts by weight as the polymerization initiator and the base were uniformly dissolved and stirred by the dissolving apparatus with the stirrer to produce a coating agent.

INVENTIVE EXAMPLE 15

The OBM of 10 parts by weight and the DAA-P of 5 parts by weight as the polymerization initiator and the base were uniformly dissolved and stirred by the dissolving apparatus with the stirrer to produce a coating agent.

INVENTIVE EXAMPLE 16

The BP100 of 2 parts by weight and the DAA-P of 2 parts by weight as the polymerization initiator and the base were uniformly dissolved and stirred by the dissolving apparatus with the stirrer to produce a coating agent.

INVENTIVE EXAMPLE 17

The BP100 of 3 parts by weight and the DAA-P of 6 parts by weight as the polymerization initiator and the base were uniformly dissolved and stirred by the dissolving apparatus with the stirrer to produce a coating agent.

INVENTIVE EXAMPLE 18

The BP100 of 4 parts by weight and the DAA-P of 8 parts by weight as the polymerization initiator and the base were uniformly dissolved and stirred by the dissolving apparatus with the stirrer to produce a coating agent.

INVENTIVE EXAMPLE 19

The BP100 of 5 parts by weight and the DAA-P of 1 part by weight as the polymerization initiator and the base were uniformly dissolved and stirred by the dissolving apparatus with the stirrer to produce a coating agent.

INVENTIVE EXAMPLE 20

The BP100 of 5 parts by weight and the DAA-P of 5 parts by weight as the polymerization initiator and the base were uniformly dissolved and stirred by the dissolving apparatus with the stirrer to produce a coating agent.

INVENTIVE EXAMPLE 21

The BP100 of 10 parts by weight and the DAA-P of 5 parts by weight as the polymerization initiator and the base were uniformly dissolved and stirred by the dissolving apparatus with the stirrer to produce a coating agent.

Material properties of compositions of the above inventive examples 9 to 21 were evaluated as follows. The material properties are evaluated similarly to the above-described inventive examples, except the following material properties.

measurement of viscosity

Viscosity of each of the materials of the above inventive examples at 25° C. was measured by using the viscometer of cone plate type manufactured by Harke CO., Ltd, in which a sensor system, a measuring system and a sensor were PK100, Rotovisco RV20-M5 and PK5, 1°. A cubic volume of each of the samples of the above inventive examples were set to 1.5 cm$^3$, and a shear rate was set to 1000 s$^{-1}$.

When the viscosity value was within a range from 25 mPa.s to 35 mPa.s, the value was evaluated as a value giving no harmful influence to productivity and indicated with an open circle. Other values were evaluated with crosses.

appearance

The ultraviolet curing resin compositions of the inventive and comparative examples were coated by the spin coating on polycarbonate substrates with their diameters of 12 cm and their thickness of 1.2 mm on each of which aluminum was evaporated. Then, the ultraviolet curing resin compositions were cured by radiation of the ultraviolet rays under the above-described conditions to form the protective films with their thickness of about 7 μm, which were evaluated through direct view as shown in Table 3.

TABLE 3

| color of cured film | evaluation |
| --- | --- |
| a range from colorless and transparent film to a light yellow and transparent film having the same color as a CD available on market | ○ |
| every color which seems to be deeper than that of the CD available on market | X | smell

The ultraviolet curing resin compositions of the inventive examples 9 to 21 were coated by the spin coating on polycarbonate substrates with their diameters of 12 cm and their thickness of 1.2 mm on each of which aluminum was evaporated. Then, the ultraviolet curing resin compositions were cured as described above to form sample disks. Subsequently, 100 sample disks were piled up. Degree of smell emitted from the 100 disks were evaluated at times just after the resin compositions were cured and after 24 hours passed.

smell

The ultraviolet curing resin compositions of the inventive examples 9 to 21 were coated by the spin coating on polycarbonate substrates with their diameters of 12 cm and their thickness of 1.2 mm on each of which aluminum was evaporated. Then, the ultraviolet curing resin compositions were cured as described above to form sample disks. Subsequently, 100 sample disks were piled up. Degree of smell emitted from the 100 disks were evaluated at times just after the resin compositions were cured and after 24 hours passed.

TABLE 4

| smell | evaluation |
| --- | --- |
| when no smell was detected just after the resin was cured and after 24 hours passed, or when a little smell was detected after the resin was cured but no smell was detected after 24 hours passed | ○ |
| when smell was detected after 24 hours passed, when smell became stronger as time passed, and when strong smell was detected just after the resin was cured | X |

FIGS. 3 and 4 show results in which the samples of the inventive examples 9 to 21 are evaluated with respect to the above items.

Evaluated results of the samples of the inventive examples 9 to 21 reveal that the obtained samples were satisfactory in all the items since the viscosity, the PII value, the hardness, the adhesion (to Aluminum), the adhesion (to polycarbonate), the corrosion resistance, the appearance, and the smell of each sample were marked with an open circle, a level A, a degree H, a level A, a value 100/100, a level A, an open circle and an open circle, respectively.

On the other hand, the sample of inventive example 6, i.e., a sample made by mixing the 1173 of 7 parts by weight as the photopolymerization initiator with a base including the 3EO-TMPTA of 50 parts by weight and the Photomer 4160 of 30 parts by weight as the multifunctional acrylate, PO-A of 20 parts by weight as the diluent, and the PM-2 of 0.1 part by weight as the adhesion promotor, had smell, thereby being evaluated with a cross.

While the sample of the inventive example 6 was evaluated with the cross with respect to the smell, the samples of inventive examples 9 to 21 were improved to be evaluated with the open circles. The reason of this improvement seems to result from that the mixture of benzophenone and paradimethylaminoacetophenone or the mixture of methyl orthobenzoylbenzoate and paradimethylaminoacetophenone was used as the photopolymerization initiator in each of the inventive examples 9 to 21.

For satisfying all standards in hardness, smell, appearance and corrosion resistance, it is preferable to use the mixture of benzophenone and paradimethylaminoacetophenone or the mixture of methyl orthobenzoylbenzoate and paradimethylaminoacetophenone as the photopolymerization initiator used in the present invention. When the mixture of benzophenone and paradimethylaminoacetophenone is used, the coating agent which is satisfactory in view of characteristics can be obtained if total parts by weight of the two components of the mixture is 4 to 15 parts by weight with benzophenone of 2 to 10 parts by weight and a ratio of benzophenone to paradimethylaminoacetophenone is within a range from 10 to 1 to 1 to 2.

Similarly, when the mixture of methyl orthobenzoylbenzoate and paradimethylaminoacetophenone is used, the coating agent which is satisfactory in view of characteristics can be obtained if total parts by weight of the two components of the mixture is 5 to 15 parts by weight with methyl orthobenzoylbenzoate of 1 to 10 parts by weight and a ratio of methyl orthobenzoylbenzoate to paradimethylaminoacetophenone is within a range from 10 to 1 to 1 to4.

Optimum use range of other compositions used in the inventive examples 9 to 21 are the same as those described in the inventive examples 1 to 8.

As described above, according to these inventive examples 9 to 21, since total 100 parts by weight of the acrylate (and/or the methacrylate) of 75 to 95 parts by weight which is made by blending the trifunctional acrylate (and/or the trifunctional methacrylate) and the bifunctional acrylate denatured with ethylene oxide (EO), the phenoxyethyl acrylate or the phenoxydiethyleneglycol acrylate of 5 to 25 parts by weight and the photopolymerization assistant of 4 to 15 parts by weight per the above 100 parts by weight are mixed, the coating agent having low skin irritations and low viscosity can be obtained, whereby a maintenance person of the disk manufacturing apparatus is prevented from getting a rash and its satisfactory coating property leads to satisfactory workability in view of manufacturing. Further, the coating agent is quickly cured by the ultraviolet rays and excellent in adhesion and hardness. Since the test in resistance to environment reveals that the protective film made of the coating agent is excellent in protection from corrosion of the metal thin film layer, reliability of the disk can be improved.

Further, since only a considerably little smell is emitted from the disk obtained after the ultraviolet curing resin is cured, the working environment is prevented from being aggravated by bad smell emitted therefrom even when a large number of disks are manufactured.

Subsequently, further another inventive examples of the ultraviolet curing resins according to the present invention will be described.

Abbreviations of respective compositions used in inventive examples 22 to 25 and comparative examples 6 and 7 are as follows in addition to the abbreviations used in the above-described inventive and comparative examples.
(Abbreviation) (Composition)

SM11: dimethylsiloxane denatured with ethylene oxide (EO) (manufactured by Matsumoto Yushi-Seiyaku CO.,Ltd.)

SA200: dimethylsiloxane diacrylate (manufactured by Shin-Nakamura Chemistry Co., Ltd.)

Newcal 1607 polyoxyethylenealkyl ether (manufactured by Nippon Nyukazai Co., Ltd.)

Mixture ratios of compositions of inventive examples 22 to 25 and comparative examples 6 and 7 are as follows.

In each of the inventive examples 22 to 25 and the comparative examples 6 and 7, the 3EO-TMPTA of 50 parts by weight and the Photomer 4160 of 30 parts by weight as the multifunctional acrylate, the PO-A of 20 parts by weight as the diluent and the PM-2 of 0.1 part by weight as the adhesion promotor are mixed to prepare a base, i.e., the same base as described in the inventive example 6.

INVENTIVE EXAMPLE 22

The OBM of 5 parts by weight and the DAA-P of 3 parts by weight as the initiator, the SA200 of 0.5 part by weight as a surface tension adjusting agent and the base were uniformly dissolved and stirred by the dissolving apparatus with the stirrer to produce a coating agent.

INVENTIVE EXAMPLE 23

The OBM of 5 parts by weight and the DAA-P of 5 parts by weight as the initiator, the SA200 of 1.0 part by weight as a surface tension adjusting agent and the base were uniformly dissolved and stirred by the dissolving apparatus with the stirrer to produce a coating agent.

INVENTIVE EXAMPLE 24

The BP100 of 5 parts by weight and the DAA-P of 3 parts by weight as the initiator, the SA200 of 0.01 part by weight as the surface tension adjusting agent and the base were uniformly dissolved and stirred by the dissolving apparatus with the stirrer to produce a coating agent.

INVENTIVE EXAMPLE 25

The BP100 of 6 parts by weight and the DAA-P of 6 parts by weight as the initiator, the SA200 of 0.1 part by weight as the surface tension adjusting agent and the base were uniformly dissolved and stirred by the dissolving apparatus with the stirrer to produce a coating agent.

Comparative Example 6

The BP100 of 5 parts by weight and the DAA-P of 5 parts by weight as the initiator, the dimethylsiloxane denatured with ethylene oxide and propylene oxide, under the trade name of SM11, of 0.1 part by weight as the surface tension adjusting agent and the base were uniformly dissolved and stirred by the dissolving apparatus with the stirrer to produce a coating agent.

Comparative Example 7

The BP100 of 5 parts by weight and the DAA-P of 5 parts by weight as the initiator, polyoxyethylenealkyl ether, under the trade name of Newcal 1607, of 0.1 part by weight as the surface active agent of hydrocarbon system and the base were uniformly dissolved and stirred by the dissolving apparatus with the stirrer to produce a coating agent.

Material properties of compositions of the above inventive examples 22 to 25 and comparative examples 6 and 7 were evaluated as follows. The material properties were evaluated similarly to the above-described inventive examples, except the following material properties.
measurement of viscosity Viscosity of each of the materials of the above inventive examples at 25° C. was measured by using the viscometer of cone plate type manufactured by Harke CO., Ltd, in which a sensor system, a measuring system and a sensor are PK100, Rotovisco RV20-M5 and PK5, , 1°, respectively. A cubic volume of each of the samples of the above inventive and comparative examples were set to 1.5 cm$^3$, and a shear rate was set to 1000 s$^{-1}$.

When the viscosity value was within a range from 25 mPa.s to 35 mPa.s, the value was evaluated as a value giving no harmful influence to productivity and indicated with an open circle. Other viscosity values were evaluated with crosses.
hardness measured by using a pencil Each sample was coated on a glass plate by using a coil bar #12 and then was radiated with ultraviolet rays under the above conditions to obtain a cured film. A pencil under the trade name of Mitsubishi Uni was used to measure hardness of a surface of each cured film in accordance with JIS K5400. It is preferable for practical hardness to be hardness exceeding a level F which is harder than a level B or HB of polycarbonate which is a substrate. Therefore, a sample having hardness exceeding the level F is evaluated with an open circle, and a sample having hardness equal to or smaller than is evaluated with a cross.
defoaming property Defoaming property of each sample was measured on the basis of time until bubbles disappeared after resin composition of 30 g is put into a transparent glass bottle with its capacity of 100 cc and shaken by a paint shaker (manufactured by Red Devil Co., Ltd under the trade name of model Nos. 5400) for five minutes to be kept. When the bubbles completely disappeared within ten minutes, the sample was evaluated with an open circle. When the bubbles did not disappear within twenty minutes, the sample was evaluated with a cross. In another case, the sample was evaluated with an open triangle.

surface tension

Values of surface tension of the samples at 25° C. were measured with an automatic tension meter (manufactured by Kyowa Surface Science Co., Ltd. under the trade name of CBVP-A3 type). When surface tension of the sample has a value of 30 dyne/cm or less, the sample has a stable wetting property relative to a surface formed of Aluminum by the evaporation or the sputtering and then is evaluated with an open circle. When the surface tension of the sample has a value exceeding 30 dyne/cm, the sample has unsatisfactory wetting property and then is evaluated with a cross. A surface tension of resin composition without a surface active agent added has a value within a range of 35 to 45 dyne/cm. In this case, depending upon a state of aluminum on a recording film of an optical disk, the aluminum often becomes oxidized before the resin is coated thereon after the aluminum is evaporated. Therefore, a surface tension of the aluminum is lowered and becomes approximate to a surface tension of the resin composition, so that the wetting property of the aluminum is aggravated and, in the worst case, prevented from being adhered to the resin material.

FIG. 5 shows results in which the samples of inventive examples 22 to 25 and comparative examples 6 and 7 are evaluated with respect to the above items.

Evaluated results of the samples of inventive examples 22 to 25 reveal that the obtained samples were satisfactory in all the items since the viscosity, the PII value, the hardness, the adhesion (to Aluminum), the adhesion (to polycarbonate), the corrosion resistance, the defoaming property, and the surface tension of each sample were marked with an open circle, a level A, an open circle, a level A, a value of 100/100, a level A, an open circle and an open circle, respectively.

On the other hand, evaluated results of the samples of comparative examples 6 and 7 reveal that the samples were satisfactory in the viscosity, the PII value, the hardness, the adhesion (to Aluminum), the adhesion (to polycarbonate), and the corrosion resistance since they were marked with an open circle, a level A, an open circle, a level A, a value of 100/100, and a level A, respectively, but that each of the samples was not satisfactory in either the defoaming property or the surface tension.

The reason of satisfactory results in both of the defoaming property and the surface tension of the inventive examples 22 to 25 seems to result from use of SA 200 made of dimetylsiloxane methacrylate (manufactured by Shin-Nakamura Chemical Co. Ltd,.) as the surface tension adjusting agent.

For obtaining satisfactory results in both the defoaming property and in lowering the surface tension, it is preferable to use dimetylsiloxane methacrylate or acrylate as the surface tension adjusting agent used in the present invention. When an amount of the above surface tension adjusting agent is set within a range from 0.01 part by weight to 1.0 part by weight, the coating agent satisfactory in view of characteristics can be obtained.

Optimum use range of other materials used in the inventive examples 22 to 25 are the same as those described in the inventive examples 1 to 21.

As described above, when the coating agent according to the present invention is used to form the cured, coated film, the film has low skin irritations and little generation of the bubbles and is quickly cured by the ultraviolet rays and further excellent in hardness of its surface, adhesion and corrosion resistance as the protective film for the optical disk substrate and does not stink strongly after the coating agent is cured.

As described above, according to the present invention, the ultraviolet curing resin having low skin irritations can be obtained, so that the maintenance person for the manufacturing apparatus can be prevented from getting a rash.

In view of manufacturing, the coating property of the coating agent according to the present invention becomes satisfactory, so that the workability is improved.

The coating agent according to the present invention is quickly cured by ultraviolet rays and excellent in adhesion and hardness and further can serve as the protective film excellent in prevention from corrosion of the metal thin film layer.

The coating agent according to the present invention is prevented from stinking after being cured, so that the working environment is prevented form being aggravated.

According to the present invention, there can be obtained the coating agent having low skin irritations, little generation of the bubbles, and low viscosity.

Having described preferred embodiments of the present invention with reference to the accompanying drawings, it is to be understood that the present invention is not limited to the above-mentioned embodiments and that various changes and modifications can be effected by one skilled in the art without departing from the spirit or scope of the present invention as defined in the appended claims.

What is claimed is:

1. An ultraviolet curable resin coating composition for an optical disk , said coating composition comprising:

(a) from about 30 to about 60 parts by weight of trimethylolpropane triacrylate denatured with ethylene oxide and having a primary irritation index value of 2 or less;

(b) from about 20 to about 50 parts by weight of bifunctional monomer having two acrylate or methacrylate groups and having a primary irritation index value of 2 or less and selected from the group consisting of neopentylglycol diacrylate hydroxypivalate, neopentylglycol diacrylate denatured with ethylene oxide and mixtures of the foregoing;

(c) from about 5 to about 25 parts by weight of a monofunctional monomer having one acrylate group or methacrylate group and having a primary irritation index value of 2 or less and selected from the group consisting of phenoxyethyl acrylate, phenoxydiethyleneglycol acrylate, and mixtures of the foregoing, based upon the total weight of (a), (b) and (c) combined;

(d) from about 0.1 to about 5 parts by weight based on 100 parts by weight of (a), (b), and (c) of di(meth)acrylate phosphate denatured with ethylene oxide;

(e) from about 0.01 to 1.0 parts by weight, based on 100 parts by weight of (a), (b) and (c) of dialkyl siloxane di(meth)acrylate; and (f) from about 0.2 to about 20 parts by weight per 100 parts by weight of (a), (b) and (c) of a photopolymerization initiator.

2. A coating composition as defined in claim 1, wherein said photopolymerization initiator comprises a mixture of paradimethylaminoacetone and methyl orthobenzoylbenzoate present in a weight ratio of from about 25:75 to about 80:20, respectively.

3. A coating composition as defined in claim 1, wherein said photopolymerization initiator comprises a mixture of paradimethylaminoacetone and benzophenone present in a weight ratio of from about 17:83 to about 67:33, respectively.

4. An ultraviolet curable resin coating composition for an optical disk, said coating composition comprising:
- (a) 100 parts by weight of a mixture of tri-(meth) acrylate-functional or bi-(meth)acrylate-functional monomers, alone or in combination with mono-(meth)acrylate-functional monomers and containing from about 30 to about 60 parts by weight of said tri(meth)acrylate-functional monomers, said mixture having a primary irritation index of about 2 or less;
- (b) from about 0.01 to about 1.0 parts by weight, based on 100 parts by weight of (a) of dialkylsiloxane di(meth)acrylate; and
- (c) from about 0.2 to about 20 parts by weight, based on 100 parts by weight of (a) of a photopolymerization initiator.

5. A coating composition in claim 4, wherein said dialkylsiloxane di(meth)acrylate is dimethylsiloxane diacrylate.

* * * * *